United States Patent
Chang et al.

(10) Patent No.: US 11,016,686 B2
(45) Date of Patent: May 25, 2021

(54) APPARATUS AND METHOD OF BAD LOCATION MANAGEMENT FOR STORAGE CLASS MEMORY USING DISTRIBUTED POINTERS

(71) Applicant: Wolley Inc.

(72) Inventors: Yu-Ming Chang, Zhubei (TW); Chuen-Shen Bernard Shung, San Jose, CA (US)

(73) Assignee: Wolly Inc., San Jose, CA (US)

(*) Notice: Subject to any disclaimer, the term of this patent is extended or adjusted under 35 U.S.C. 154(b) by 77 days.

(21) Appl. No.: 16/574,104

(22) Filed: Sep. 18, 2019

(65) Prior Publication Data

US 2021/0081107 A1    Mar. 18, 2021

(51) Int. Cl.
*G06F 3/06* (2006.01)

(52) U.S. Cl.
CPC ............ *G06F 3/064* (2013.01); *G06F 3/0616* (2013.01); *G06F 3/0619* (2013.01); *G06F 3/0653* (2013.01); *G06F 3/0659* (2013.01); *G06F 3/0673* (2013.01); *G06F 3/0614* (2013.01); *G06F 3/0679* (2013.01)

(58) Field of Classification Search
CPC .... G06F 3/0619; G06F 3/0614; G06F 3/0659; G06F 3/0679; G06F 3/0688
USPC ......................................................... 711/154
See application file for complete search history.

(56) References Cited

U.S. PATENT DOCUMENTS

| | | | |
|---|---|---|---|
| 10,229,047 B2 | 3/2019 | Shung | |
| 10,353,812 B2 | 7/2019 | Shung | |
| 10,394,708 B2 | 8/2019 | Shung | |
| 2015/0003156 A1* | 1/2015 | Berckmann | G11C 29/04 365/185.09 |
| 2015/0324142 A1* | 11/2015 | Sepulveda | G06F 11/1441 711/103 |
| 2016/0048459 A1* | 2/2016 | Oh | G06F 12/0246 711/103 |
| 2019/0347170 A1* | 11/2019 | Bradshaw | G06F 3/0631 |

* cited by examiner

*Primary Examiner* — Than Nguyen
(74) *Attorney, Agent, or Firm* — Blairtech Solution LLC

(57) ABSTRACT

A method and apparatus of bad location management for storage class memory are disclosed. A nonvolatile memory is partitioned into a non-reserved space and a reserved space, which are divided into multiple data units. The health status of the data units in the non-reserved space are classified into multiple classes including a mostly-good class. For host data read, the data from a mostly-good data unit are read and whether the data includes a pointer is checked. If no pointer, the data read are returned as the host data. Otherwise, the data unit pointed by the pointer is read. For data write, the data from a mostly-good data unit are read. If no pointer in the read data, the host data are written into the mostly-good data unit. Otherwise, the host data are written into the data unit in the reserved space pointed by the pointer.

17 Claims, 7 Drawing Sheets

APPARATUS AND METHOD OF BAD LOCATION MANAGEMENT FOR STORAGE CLASS MEMORY USING DISTRIBUTED POINTERS

CROSS REFERENCE TO RELATED APPLICATIONS

The present invention is related to U.S. Non-Provisional patent application Ser. No. 15/230,414, filed on Aug. 6, 2016, now U.S. Pat. No. 10,229,047 issued on Mar. 12, 2019, U.S. Non-Provisional patent application Ser. No. 16/190,017, filed on Nov. 13, 2018, now U.S. Pat. No. 10,394,708, issued on Aug. 27, 2019 and U.S. Non-Provisional patent application Ser. No. 16/190,043, filed on Nov. 13, 2018, now U.S. Pat. No. 10,353,812, issued on Jul. 16, 2019. The U.S. Non-Provisional Patent Application is hereby incorporated by reference in its entirety.

FIELD OF THE INVENTION

The present invention relates to memory management and control. In particular, the present invention relates to bad location management for memory device in order to extend the endurance of the memory device.

BACKGROUND AND RELATED ART

In computer architecture the memory hierarchy is a concept used for storing and discussing performance issues in computer architectural design, algorithm predictions, and the lower level programming constructs such as involving locality of reference. The memory hierarchy in computer storage distinguishes each level in the hierarchy by response time. Since response time, complexity, and capacity are related, the levels may also be distinguished by their performance and controlling technologies.

In the context of this disclosure, the memory hierarchy of interest consists of (a) processor registers, (b) caches (L1, L2, L3, etc.), (c) main memory, and (d) disk storage. For memory devices that are "farther" away from the CPU (or "lower" in the memory hierarchy), the capacity is bigger while the response time is longer. The capacity of these memory devices is in the order of (a) less than Kilobytes, (b) Megabytes to tens of Megabytes, (c) tens of Gigabytes, and (d) Terabytes, respectively. The response time of these memory devices is in the order of (a) sub-nanoseconds, (b) nanoseconds, (c) tens of nanoseconds, and (d) tens of milliseconds for random access of Hard Disk Drives (HDDs), respectively. In recent years, one of the major technology advancement in memory hierarchy has been the wider adoption of solid-state disks (SSDs), built with NAND Flash, which improves the disk response time to tens of microseconds.

Even with SSDs, there is still a big gap in response time between (c) and (d). On top of that, (a)-(c) are "byte-addressable" (although in practice, memory hierarchy levels (b)-(c) are often addressed with 64-byte unit), while memory hierarchy level (d) is "block-addressable" with a block size typically 512-byte or 4K-byte. In computer terms, the former is a "memory access" while the latter is a "storage access" or "I/O (Input/Output) access". The different access semantics and block transfer size also increase the overhead of accessing the disk.

One attempt to avoid the disk access as much as possible, in order to improve performance, is to increase the main memory capacity. However, due to cost and power reason, there is a bound to this investment, especially as the Moore's Law scaling for DRAM will no longer be able to reduce cost and power much more. Furthermore, given the overwhelming trend of cloud computing and big data applications, the data size of interest is getting bigger and bigger, and hence simply trying to increase main memory capacity will lose in this foot race.

Other than response time and capacity difference, there is also another significant difference between memory and disk. Memory is volatile and disks (SSDs or HDDs) are non-volatile. When power is lost, the memory content is lost, while the disk content is kept. It is very important for online transaction processing (OLTP) to write the results to some non-volatile storage to formally complete the transaction to safeguard against unexpected power loss. This is another reason why disk operations are necessary. How to efficiently interact with disks while not slowing down the operation performance has been an active topic of research and development by computer scientists for decades.

It is therefore intuitively obvious that it would be ideal to have a memory device that has the response time and byte-addressable property of the memory, and the capacity and non-volatile property of the disks. This kind of memory is generally referred to as the Storage Class Memory (SCM) (G. Burr et al., "Overview of candidate device technologies for storage-class memory", *IBM Journal of Research and Development* 52(4/5): pp. 449-464, June 2008). In the past many years, there were numerous attempts by different companies and research groups to develop SCMs using different materials, processes, and circuit technologies. Some of the most prominent examples of SCMs to date include Phase Change Random Access Memory (PCRAM), Resistive Random Access Memory (RRAM), and Spin-transfer torque Magnetic Random Access Memory (STT-MRAM). In 2015, Intel™ and Micron™ announced advanced SCM that is claimed to be "1000 faster than NAND flash and 10 times denser than DRAM". If SCMs become available, many believe that a natural place in the memory hierarchy for SCMs will be between memory hierarchy level (c) and memory hierarchy level (d) mentioned above to bridge the gap in between.

As all memory devices, the manufacturing process of a chip with a capacity as large as tens of Gigabits cannot be perfect, and there could be some fallout of a small portion of the memory bits. Traditionally the percentage of good devices in a semiconductor manufacturing batch is called the yield. Yield is arguable the single most important factor to determine the profitability—as the manufacturing investment is roughly the same, being able to produce more working chips is critical. It is also intuitive that it is very important to be able to tolerate some small portion of failed memory bits in the SCM chip. If this is doable, then a SCM chip with small portion of failed memory bits can still be considered working, or part of the yield.

After SCM chips are manufactured, a manufacturing test is performed to screen out the SCM chips with more failed bits and they are rejected. Second, some techniques are employed to be able to avoid failed bits during the application of those acceptable (or good enough) SCM chips. In this disclosure, the latter technique is generally referred to as bad location management. But the two steps are clearly very related. How much the bad location management could tolerate would determine the threshold of the manufacturing test.

Note that similar concept exists in NAND, and the corresponding technique is called bad block management. For NAND, due to the device characteristics, a failed block could be quite sizeable, sometimes as large as 16 Mbyte. But for SCM, the failed bits are more scattered. Hence we use the term bad location management to differentiate them. There is another very importance difference. For a NAND application, the host access unit (usually 4 Kbytes for storage application) resides in one NAND die or down to one NAND page. But for SCM application, the host access unit (usually 4 Kbytes for storage application or 64 Bytes for memory application) could come from multiple dies, just like DRAM. Therefore, a bad block of a NAND chip directly results in a bad block in the storage subsystem, but a bad location of a SCM chip may or may not result in a bad location in the storage or memory subsystem. The reason is that the data of the same address location is constituted by a fixed number of multiple chips. For an address location, some SCM chips contribute good data, and the bad data from the remaining SCM chips to the same address could be correctable by ECC (error correcting code). For these important differences, the bad location management technique of SCM shall be different from the bad block management techniques of NAND.

In this disclosure, I describe one bad location management invention that is designed for SCMs. To summarize the motivation of this invention, SCMs are being sought as the ideal new introduction to the memory hierarchy that has the response time and byte-addressable property of the memory, and the capacity and non-volatile property of the disks. The present invention is to provide an innovative bad location management technique to address the yield issue for SCM. In our disclosure, we are using "distributed pointers" to link the failure locations with the replacement locations. This is to contrast the table-based architecture where the intelligence is centralized in the address redirection table.

In U.S. Pat. No. 10,394,708, issued on Aug. 27, 2019, "Apparatus and Method of Damage Recovery of Storage Class Memory Using Repair Entry in Write Cache", a technique for the damage recovery of SCM is disclosed. The technique disclosed in the present invention is different from U.S. Pat. No. 10,394,708. As a matter of fact, the two techniques can work together and reinforce each other. In particular, the cited patent is effective to deal with fewer failed locations, while the current invention is effective to deal with much more failed locations. In the detailed description of the invention below, how the two techniques can work together is also disclosed.

One similar work to the same filed was published by Stuart Schechter et al in 2010. This work proposed Error-Correcting-Pointer (ECP) to redirect error locations by pointers at the granularity of bits (or cells as referred to in the paper). It allocates one pointer and one replacement cell for each 64-byte data unit commonly seen in memory application. The replacement cell stores the corrected bit data and the pointer indicates the error bit location within 64B unit once needed. Our invention is quite different from ECP in two folds. First, we manage failed locations in the size of application data unit, e.g., 64 Byte, 4 Kbyte, rather than individual data bit. Second, the correction capability of ECP is deterministic while our invention is capable of repairing much more errors once the pointer is readable. That is, a weak data unit location may not be able to store the whole data itself but is still good enough to store a pointer, which is relatively small, to indicate a new location for the whole data. Actually, ECP and our invention can also work together. We manage different size of data unit so that both techniques can reinforce each other.

BRIEF SUMMARY OF THE INVENTION

A method and apparatus of bad location management for storage class memory are disclosed. According to the present invention, nonvolatile memory is divided into a non-reserved space and a reserved space, where the non-reserved space is divided into multiple first data units and the reserved space is divided into multiple second data units. Each first data unit and each second data unit comprise multiple ECC (error correcting code) data units. When host data are read from a target first data unit at a target data unit address in the non-reserved space: first data are read from the target first data unit at the target data unit address in the non-reserved space; whether the first data read from the target first data unit includes a pointer is determined; if the first data read from the target first data unit does not include the pointer, the first data read from the target first data unit is returned as the host data; and if the first data read from the target first data unit includes the pointer, second data are read from a target second data unit in the reserved space as indicated by the pointer. When the host data are written into the target first data unit at the target data unit address in the non-reserved space: at least one part of the first data is read from the target first data unit at the target data unit address in the non-reserved space; whether said at least one part of the first data read from the target first data unit includes the pointer is determined; if said at least one part of the first data read from the target first data unit does not include the pointer, the host data are written into the target first data unit at the target data unit address; and if said at least one part of the first data read from the target first data unit includes the pointer, the host data are written into a target second data unit in the reserved space as indicated by the pointer. The multiple classes further comprise a second class corresponding to good data units and a third class corresponding to mostly-bad data units.

The method may further comprise classifying the multiple first data units into multiple classes including a first class corresponding to a mostly-good data unit, wherein the mostly-good data unit comprises a number of bad ECC data units within a range. Each of the multiple first data units and the multiple second data units comprises multiple ECC data units and said classifying the multiple first data units into the multiple classes comprises counting the number of bad ECC data units in each of the multiple first data units. If the number of bad ECC data units for a tested first data unit is larger than a first threshold and smaller than a second threshold, the tested first data unit is classified as the mostly-good data unit. If the number of bad ECC data units for a tested first data unit is smaller than a first threshold, the tested first data unit is classified as a good data unit. If the number of bad ECC data units for a tested first data unit is greater than a second threshold, the tested first data unit is classified as a mostly-bad data unit. The mostly-bad data unit is not used for data storage.

For host data read from good data units, the first data can be read from the target first data unit at the target data unit address in the non-reserved space and the first data read from the target first data unit can be returned as the host data. For host data write into good data units, the host data can be written into the target first data unit at the target data unit address.

Information associated with the multiple classes for the multiple first data units can be stored in the non-volatile memory, a volatile memory, or both. Information related to the pointer can be stored in multiple ECC data units.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Let us define a generic SCM application as M/S subsystem, where M/S stands for memory/storage. Such an M/S subsystem supports read and write operation by a host. The data size of memory and storage applications may be different, most commonly 64 Bytes (cache line) for memory applications, and 4 Kbytes for storage applications. Due to technical considerations, for memory applications, the data size of the host interface may still be 64 Bytes, but the data size to the SCM is multiple of 64 Bytes. Storage applications usually imply a non-volatile semantics.

Usually a SCM controller is deployed between the host and the SCM devices. The role of the SCM controller is to handle host protocolsand manage the SCM devices. The host protocols may be different from the SCM device access protocols.

Figure 1:
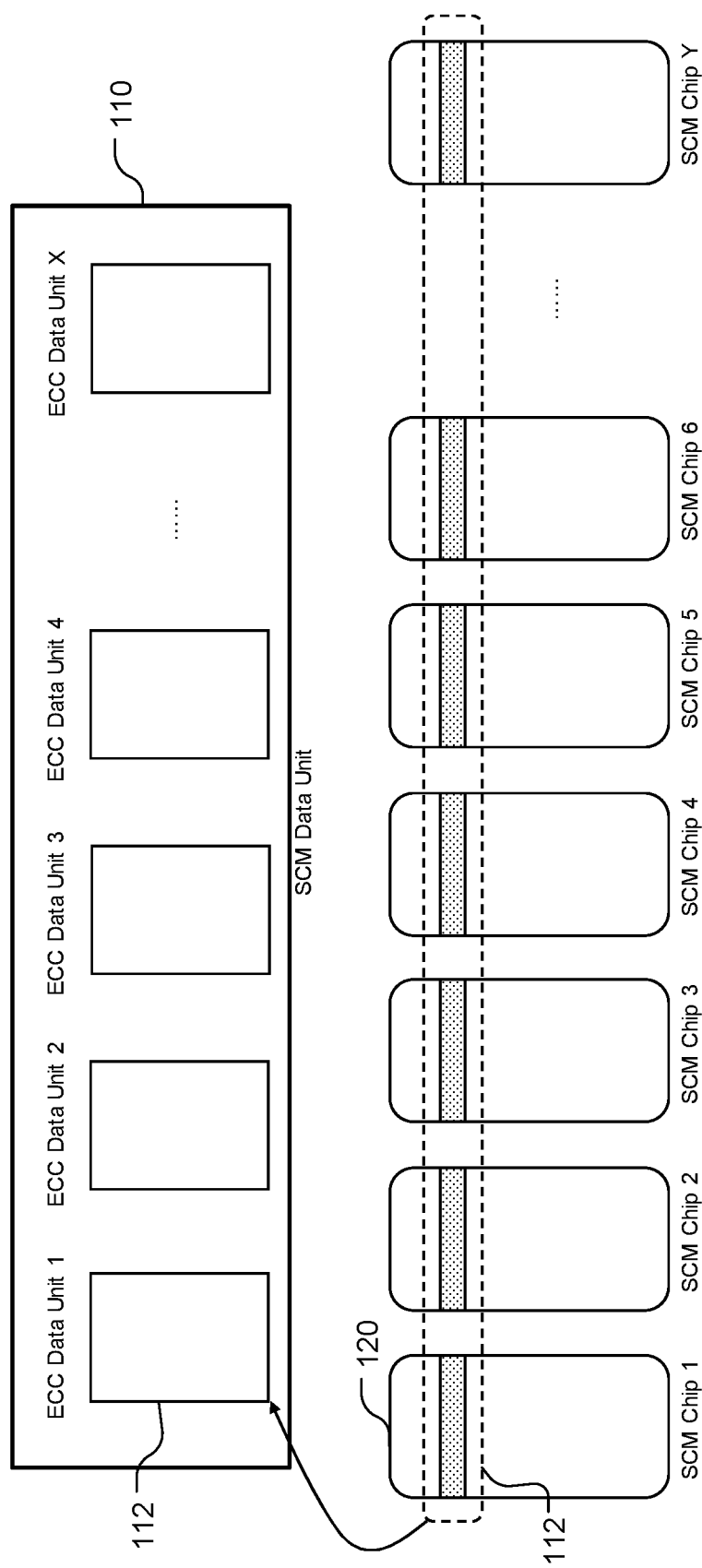
FIG. 1 illustrates the concept that a SCM data unit is composed of many ECC data units, and each ECC data unit may be composed of data from multiple SCM chips.

In this invention, we define the SCM data unit as one that the SCM controller can address to. Without loss of generality, we assume each SCM data unit is composed of one or more ECC data units. For each ECC data unit, there are data, metadata and ECC parity data. Moreover, each ECC data unit can be formed by data from multiple SCM chips. Such arrangement was also depicted in U.S. Pat. No. 10,353,812, issued on Jul. 16, 2019, "Apparatus and Method of Wear Leveling of Storage Class Memory By Reordering Input Group to Output Group Address Mapping", where it was highlighted that the wear-leveling information can be part of the metadata. The general arrangement of SCM data unit and its ECC data units is depicted in FIG. 1. In the example of FIG. 1, an SCM data unit 110 is composed of X ECC data units. Each ECC data unit 112 is formed by Y slices of data indicated by dit-filled areas, where each slice of data belongs individually to each single SCM chip 120. Why the SCM data unit 110 and ECC data unit 112 are of different size? This is because their design principles are different. The size of SCM data unit size 110 is determined by host protocol as well as address mapping considerations. For the storage application, the host protocol access unit is 4 Kbytes. For memory applications, the host protocol access unit is 64 Bytes. However, address mapping at the granularity of 64 Bytes is quite challenging, and therefore some designs use a larger SCM data unit 110 such as 256 Bytes. The size of ECC data unit 112 is determined by ECC decoder performance and throughput. A smaller code size is usually required to achieve a higher decoder throughput. For instance, although the SCM data unit 110 is 4 Kbytes for the storage application, the ECC data unit 112 can be much smaller.

Each ECC data unit is designed to be able to correct a maximum number of errors. If the number of errors (due to manufacturing defects or other reasons) are more than the decoder capability, then the ECC data unit is not decodable and the contents cannot be trusted. Since an SCM data unit is composed of multiple ECC data units, there are three cases we can consider: (1) all the ECC data units are decodable; (2) only very few of the ECC data units are not decodable, and the rest are decodable; (3) lots of the ECC data units are not decodable. It is clear that only in case (1) SCM data unit can be used to store data reliably.

One of the differences between SCM and NAND is in the area of bad block management. For NAND, during manufacturing test, the bad blocks are identified and the bad block locations are stored in the NAND (typically stored in a good-guaranteed NAND block). Such bad blocks are avoided (by a technique to be described next) by the NAND controller. However, one key difference is that the NAND data unit comes primarily from the same NAND die. Therefore, if the particular NAND has a bad block, it can uniquely determine whether the NAND data unit is bad. But for SCM, the SCM data unit is composed of multiple SCM dies (as is the case for each ECC data unit); though one SCM die has a bad block/location, it cannot determine whether the ECC data unit or the SCM data unit is bad (or decodable) or not. This is because other SCM dies being addressed may be all good, and the ECC decoder could decode despite one SCM die is bad.

For SCM, there shall be a system-level test performed by SCM controller to determine which SCM data unit (and its ECC data units) is good or bad. Such information cannot be determined at the SCM device manufacturing test level. Such a system-level test involves writing a known data to each addressable SCM data unit (or ECC data unit), and read the result back. The results of the system-level tests can be stored in the memory system such as the controller. Beside the non-volatile memory, the class information can also be stored at volatile memory such as SRAM (static random access memory) or DRAM (dynamic random access memory) in order to speed up the address translation. Furthermore, the class information can also be stored at both the non-volatile memory and the volatile memory. Without loss of generality, the results would categorize the SCM data units into the three abovementioned cases, namely (1) Good, (2) Mostly Good, (3) Mostly Bad respectively.

Figure 2:
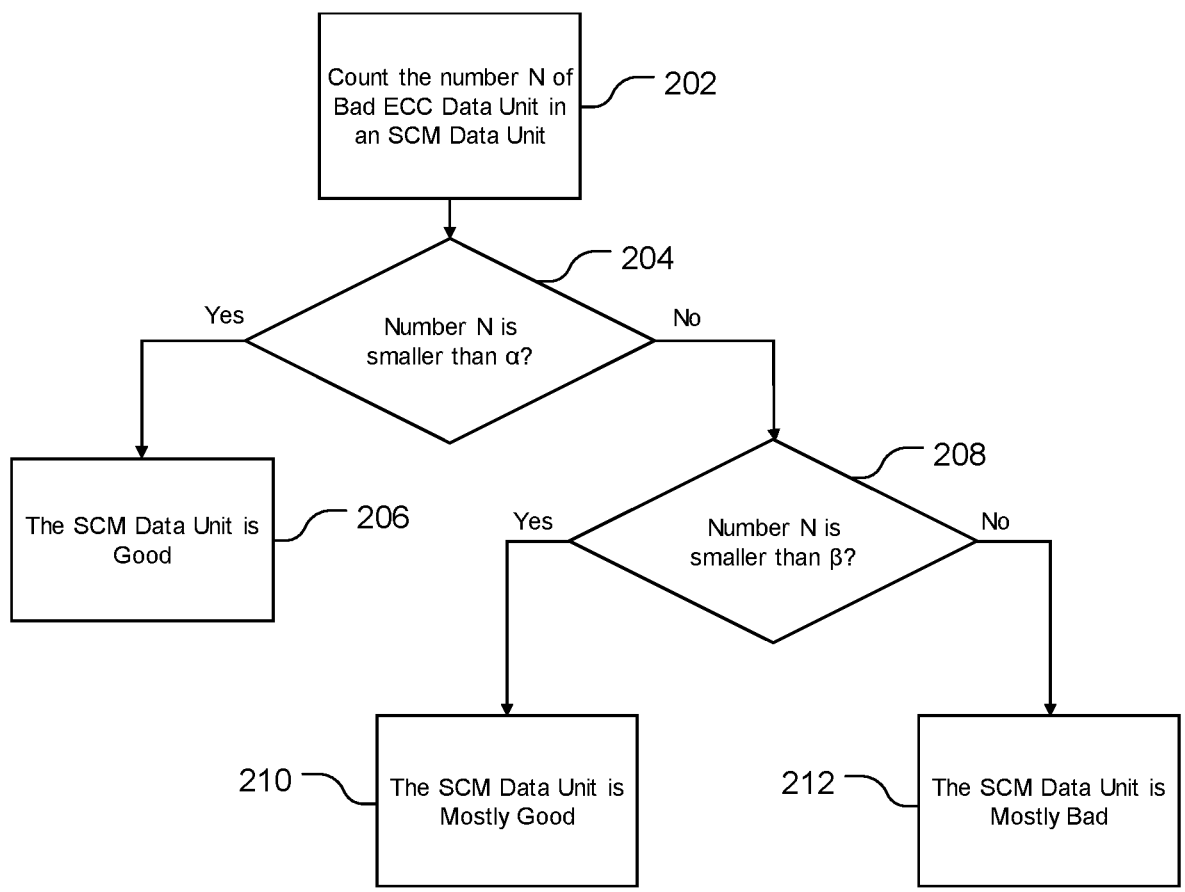
FIG. 2 illustrates the flowchart that a SCM data unit may be categorized into three types: (1) Good, (2) Mostly good, (3) Mostly bad, after the system-level test.

FIG. 2 illustrates how we categorize an SCM data unit into three different types. Given the health result of each ECC data unit in one SCM data unit, we can count how many ECC data units there are not decodable (step 202). If the number of bad ECC data units is N, we then compare N with the first threshold a (step 204). If N is smaller than a, the SCM data unit is classified into type (1) good data unit (step 206). Otherwise, N is further compared to the second threshold β (step 208). If N is smaller than β, this SCM data unit is classified into type (2) mostly good data unit (step 210). The remaining case is to classify the SCM data unit into type (3) mostly bad data unit (step 212). The values of two threshold, i.e., α and β, depend on real applications and device health status. Typically, all ECC data units should be good in a type (1) good SCM data unit in our disclosed example; that is, α is usually set to one. However, as some techniques such as RAID are used to build on top of ECC data units in the same SCM data unit, a good SCM data unit can tolerate more bad ECC data units (e.g. 2 in RAID6), then α can be set at three. If one decodable ECC data unit is large enough or capable to store/retrieve a pointer, then β can be set to X.

Figure 3:
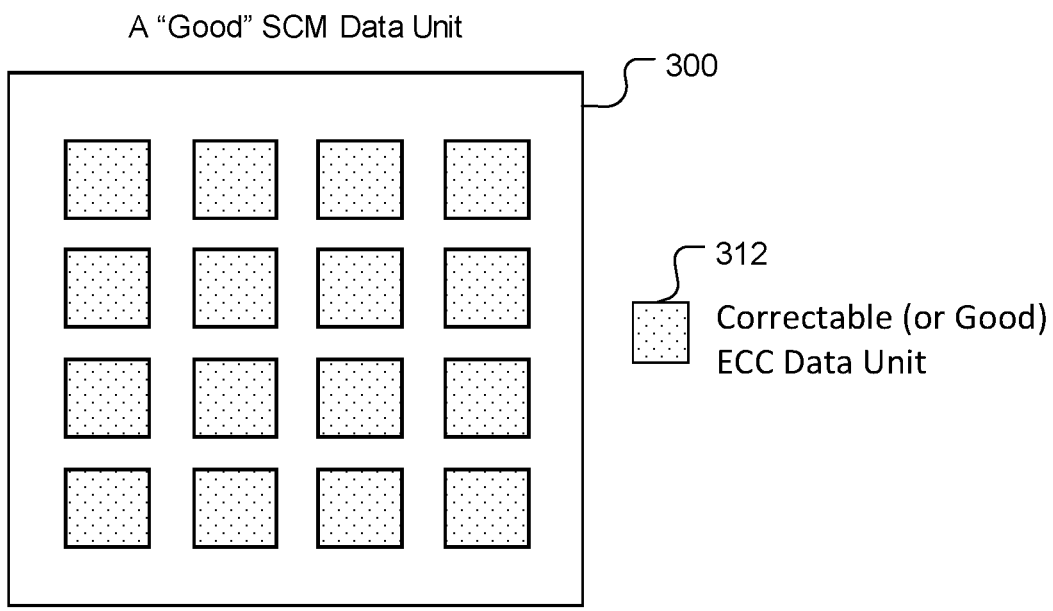
FIG. 3 illustrates one example of a Good SCM data unit.
Figure 4:
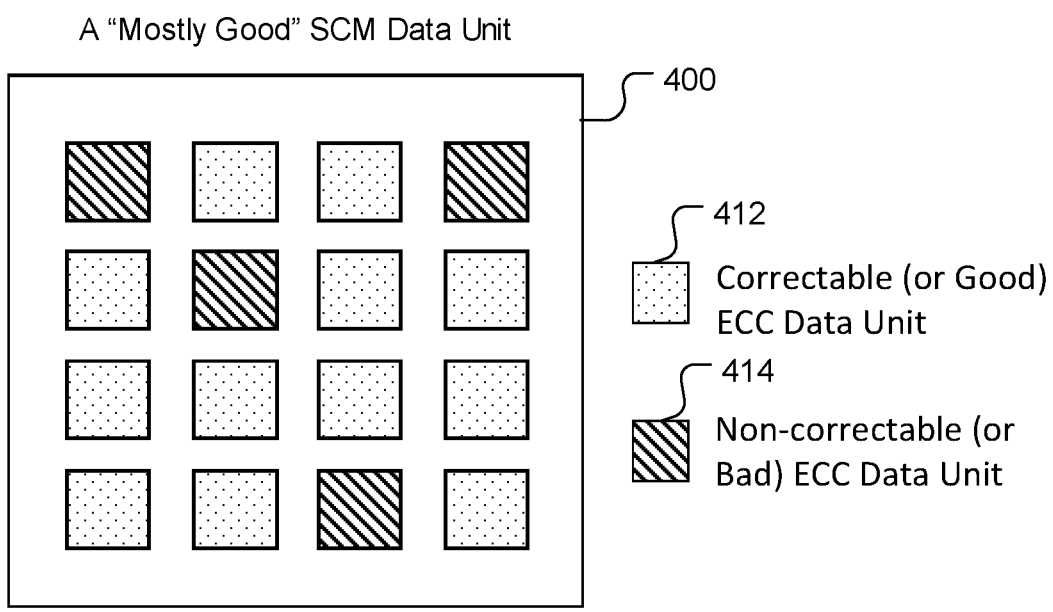
FIG. 4 illustrates one example of a Mostly Good SCM data unit.
Figure 5:
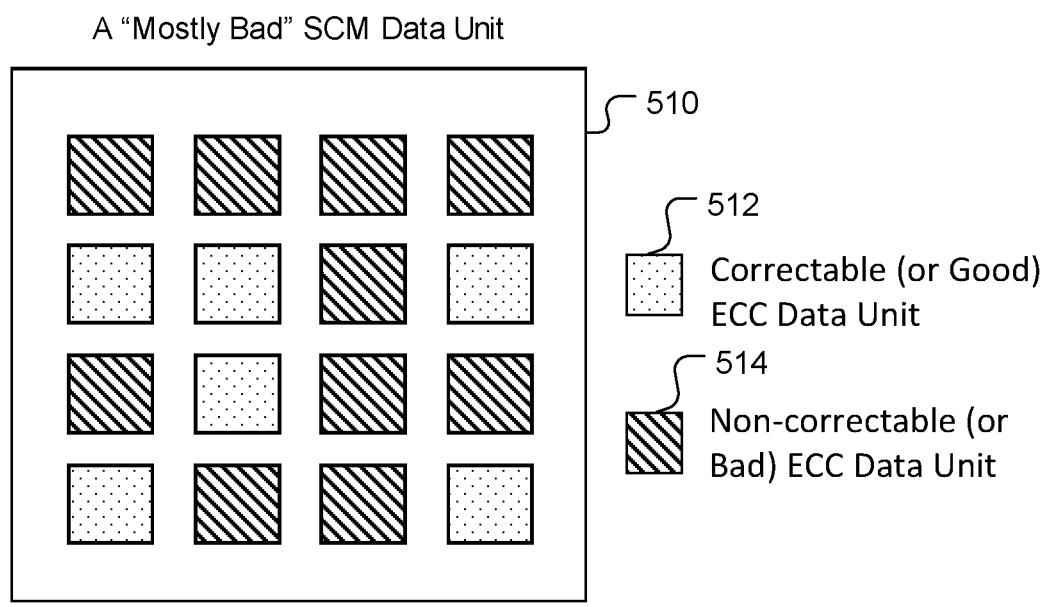
FIG. 5 illustrates one example of a Mostly Bad SCM data unit.

FIG. 3 illustrates one example of a good SCM data unit. Since the number of bad ECC data unit is less than a (e.g. α=4), this SCM data unit 310 is classified as good. The ECC data units 312 in this type of SCM data unit are usually good. FIG. 4 illustrates one example of a mostly good SCM data unit comprising some good ECC data units 412 and some bad ECC data units 414. Since the number of bad ECC data unit is not smaller than abut smaller than β (e.g. β=8), this SCM data 410 unit is classified as mostly good. FIG. 5 illustrates one example of a mostly bad SCM data unit comprising some good ECC data units 512 and some bad ECC data units 514. Since the number of bad ECC data unit is larger than β (e.g. β=8), the SCM data unit 510 is a classified as mostly bad.

In this invention, we propose an innovative method to manage the SCM data units, given that some of them fall into cases (2) and (3). But to put things in perspectives, let us first review how bad block management is done in a NAND controller. The NAND controller usually has an address indirection table (AIT) where the host logical address is mapped to a physical address used by the NAND controller to address the NAND media. The NAND controller usually maintains a free list to concatenate all address locations (or blocks) that are erased and ready to be programmed. When the bad block information is available to the NAND controller, those bad locations are eliminated from the free list, and hence won't enter into circulation. As a result, the bad block locations will not be written, and won't need to be read for the NAND data units.

The particular bad block management technique is very simple, and widely adopted in NAND controllers. But there is one drawback—it depends on the use of the AIT table. In U.S. Pat. No. 10,229,047, issued on Mar. 12, 2019, "Apparatus and Method of Wear Leveling for Storage Class Memory Using Cache Filing", a SCM controller architecture that does not require an AIT table was disclosed. A "tableless" SCM controller can be higher performance, and lower cost. If a tableless SCM controller is deployed, then the bad location management technique needs to be revised.

Let us assume that a portion of the SCM space is carved out or reserved for the bad location management. The amount of reserved space depends on the severity of the bad location situation. If there is more bad locations, then the reserved space is more. After the system-level test is performed, the SCM data units are categorized into three types: (1) Good, (2) Mostly good, (3) Mostly bad as mentioned above. We can store a "pointer" in type (2) SCM data units, where the "pointer" points to another SCM data unit inside the reserved area. Since type (2) is Mostly good, we can store the pointer (which is just a few bytes) in several ECC data units for fault tolerance. When we want to retrieve the pointer from the SCM data unit, there are multiple ECC data units storing the same information (i.e., pointer). Therefore, the information retrieval is guaranteed. The protection of pointer is not limited to just the case by redundant copy. In another embodiment, we can also build other techniques such as RAID or individually stronger ECC for the protection of pointer.

For the type (3) Mostly bad, we won't store the pointer information since it is more risky to retrieve the pointer information if the SCM data units contain too many ECC data units that are not correctable. There are techniques to make sure that the type (3) SCM data units are "don't touch". One such technique is disclosed in abovementioned U.S. Pat. No. 10,394,708. Why don't we treat type (2) and type (3) alike and cast both of them into "don't touch"? Statistically, given any bad location distribution, type (2) being far more in number than type (3) is much reasonable. Our new technique can both make good use of type (2) SCM data units, and keep the "don't touch" list small. This has very big performance and cost advantage.

Figure 6:
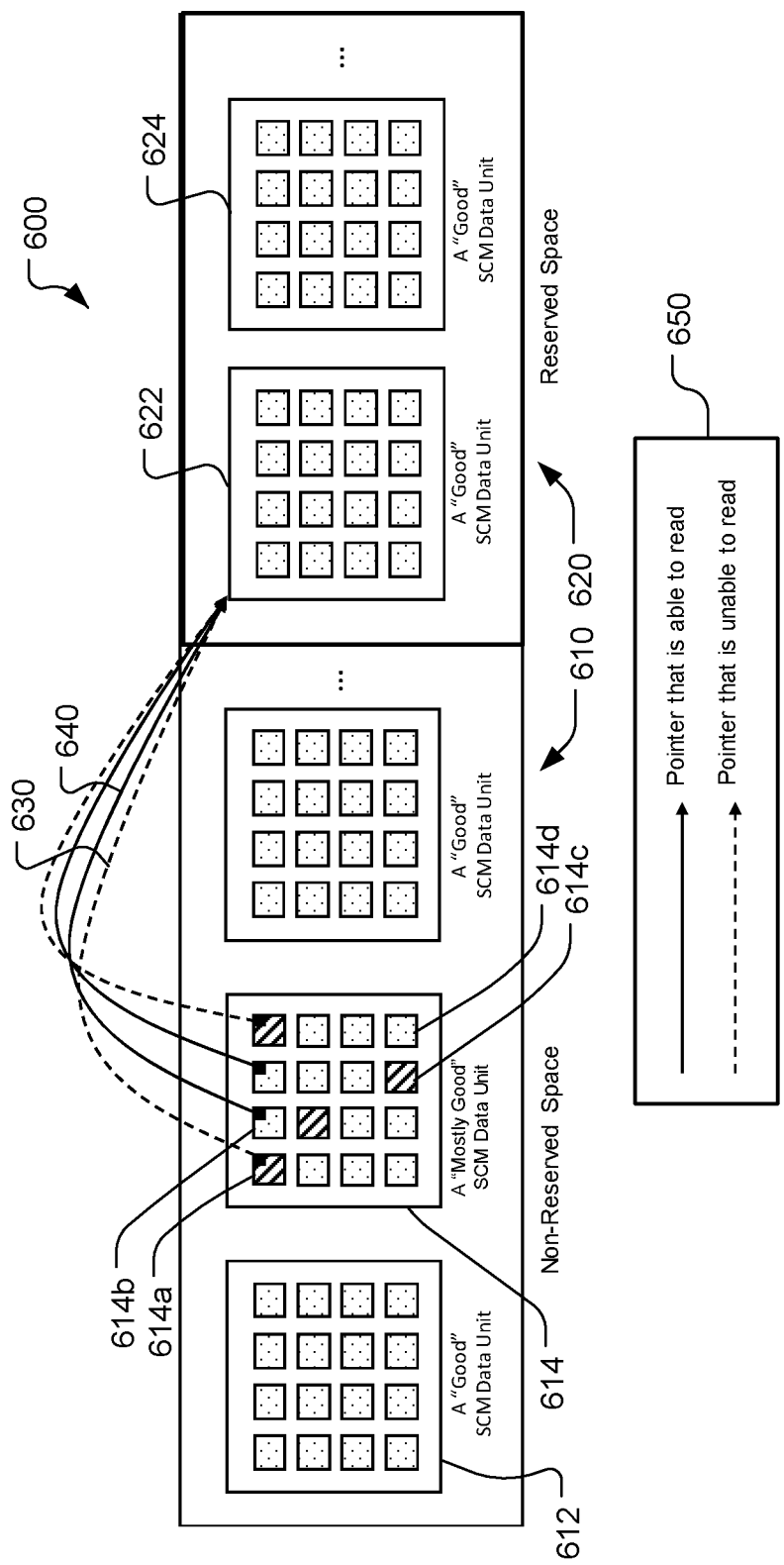
FIG. 6 illustrates the SCM M/S subsystem depicting how the type (2) SCM data units in the visible address space can be used to store a pointer to a particular SCM data unit in the non-visible (reserved) space.

FIG. 6 shows an overall view of the SCM data units in the physical address view. One portion of the space is reserved. The type (1) Good SCM data units are written and read normally. In other words, the host data can be read from a data unit at a given address directly without the need for checking the existence of a pointer in the data unit. Similarly, host data can be written to a good data unit a given address directly without the need for reading the data and checking for existence of the pointer. The type (2) Mostly good SCM data units will contain a unique pointer to a SCM data unit in the reserved space. The type (3) Mostly bad SCM data units will be in a "don't touch" list. Note that the address mapping block in front will use the "don't touch" list information and prevent physical address mapping to the type (3) SCM data units. Since the reserved space may have type (1), type (2) or type (3) SCM data units too. We will initially skip all the type (2) and type (3) SCM data units in the reserved space to be pointed. A double pointer situation is possible, where one pointer points to another SCM data unit that is also a pointer. This case can occur when the alternative data units in the reserved space get worse and therefore should be classified into type (3) SCM data units.

In the example illustrated in FIG. 6, the entire physical space 600 is divided into a non-reserved space 610 and a reserved space 620. It is assumed that the non-reserved space includes a plurality of SCM data units designated as the first 612, the second 614, and the third 616 SCM data units in the non-reserved space corresponding to good, mostly good, and good respectively. It is also assumed that the reserved space includes a plurality of SCM data units designated as the first 622 and the second 624 data units in the reserved space corresponding to good ones. As described previously, a mostly good SCM data unit 614 can store one or more pointers in ECC data units such as 614a and 614b. Among them, ECC data unit 614a stores the pointer but is not decodable while the pointer stored in ECC data unit 614b is able to read. If the pointer is accessible from a good ECC data unit 614b, the pointer 640 can points to a good SCM data unit 622 in the reserved space. Otherwise, an inaccessible pointer 630 cannot be used to find a good SCM data unit. Since the available space may be limited, not all ECC data units require to involve in maintaining pointers such as a bad ECC data unit 614c and a good ECC data unit 614d. In this example, the data units in the reserved space are all assumed to be good ones. In practice, the data units in the reserved space may deteriate over time. When an unreliable or bad data unit is found, the unreliable or bad data unit can be masked by not pointing to such data units. In FIG. 6, the legend is shown in box 650, where the solid arrow curve (e.g. 640) indicates a pointer that is able to read from the reserved space and the dashed arrow curve (e.g. 630) indicates a pointer that is unable to read from the reserved space. While only good data units are shown in the reserved space, the the reserved space may also include mostly-good data units and bad data units.

The read operation of the SCM M/S subsystem is very similar to what it is before. The only difference is that occasionally the read data from the addressed SCM data unit is a pointer instead of the data. In this case, we need to read one more time with the pointer in order to get the correct data. The probability of such indirection depends on the amount of bad locations, and for example, should be below 1-2%. The situation is quite similar to cache miss situation in traditional memory subsystem, and as long as the cache hit ratio is high, the performance degradation of the cache miss is tolerable.

The write operation is little more complicated. A read needs to happen first to the write location to determine whether the addressed location is a pointer or not. If it is not a pointer, then a normal write to the location is performed. If it is a pointer, then the write operation is performed to the pointed address location. It may seem that an overhead of an extra read operation is significant for the write operation. However, it turns out that many SCM controller needs to keep track of the write count of the address location (for wear leveling and other device management purpose). In this case, a read before write happens naturally. If the addressed location is not a pointer, the read operation obtains the necessary write count for the subsequent write operation. If the addressed location is a pointer, then another read is performed to the pointed location to retrieve the write count. Once again, the extra overhead is only for the pointer case, which is very small, such as below 1-2%.

The pointer does not make any impact on the wear leveling performance. The reserved space is not visible to the overall address space. The address mapping and wear leveling is supposed to evenly spread out the use of all visible address locations. The pointer is simply a one-to-one mapping of a visible address in the non-reserved space and a non-visible address in the reserved space, and does not change how the wear leveling is performed to the visible address.

Please note that the table-based SCM controller does need to access the AIT table first before any SCM data access can happen. If the AIT table is stored in the SCM, then there are two SCM accesses for each read. This is worse than the present proposed scheme, where in most cases there is only one SCM access due to table-less, and only in small case (e.g. 1-2%), there are two SCM accesses for the indirect access. The performance advantage is very clear. If the AIT table is stored in external DRAM instead of SCM, then in high probability (e.g. 98-99%), the present scheme is still faster since our table-less scheme does not even have DRAM access. In the very small case (e.g. 1-2%), the present scheme may be slower due to the SCM access of the pointer. However, the DRAM implementation of the AIT table comes with direct and indirect cost. Since the DRAM is volatile, its contents need to be stored in SCM during power off, often requiring a costly SuperCap (syper capacitor). Our proposed scheme is advantageous considering the overall performance and cost situation.

Figure 7:
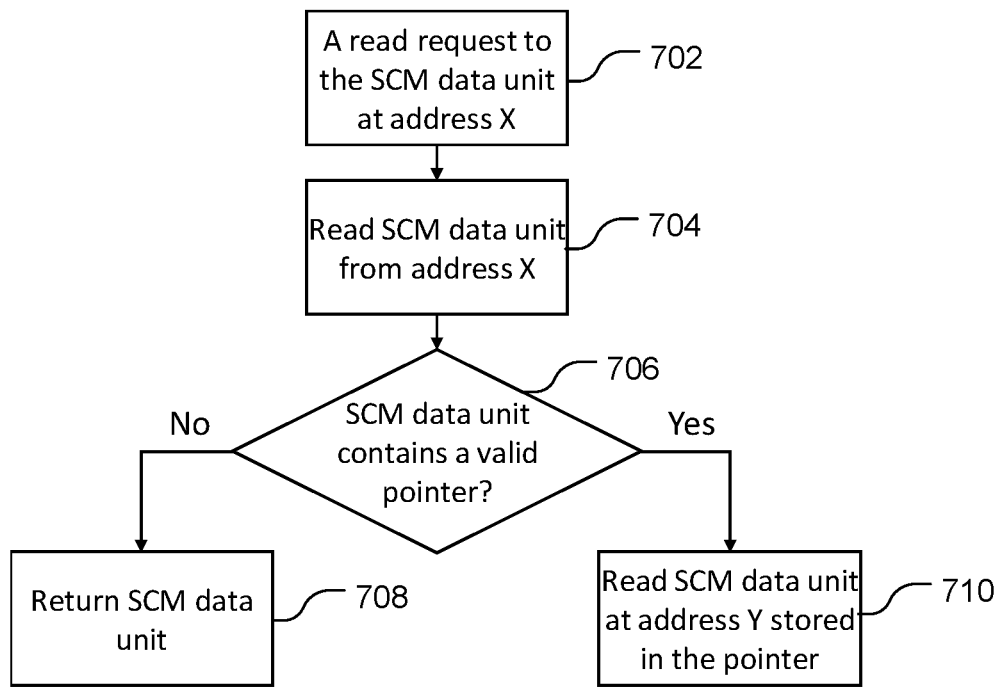
FIG. 7 illustrates the flowchart of how a read operation works according to one embodiment of the present invention.

FIG. 7 illustrates an exemplary flowchart of a read operation according to an embodiment of the present invention. If a read request is issued to the SCM data unit with address X (step 702), data are read from one or more ECC data units in this SCM data unit (step 704). Once enough information is collected, whether the SCM data unit contains a valid pointer and whether the pointer is decodable are checked (step 706). If the SCM data unit does not contain a valid pointer (i.e., the "no" path from step 706), data read is returned from this SCM data unit (step 708). Otherwise (i.e., the "yes" path from step 706), the link with pointer is followed and an additional read to the pointed SCM data unit of address Y is issued (step 710).

Figure 8:
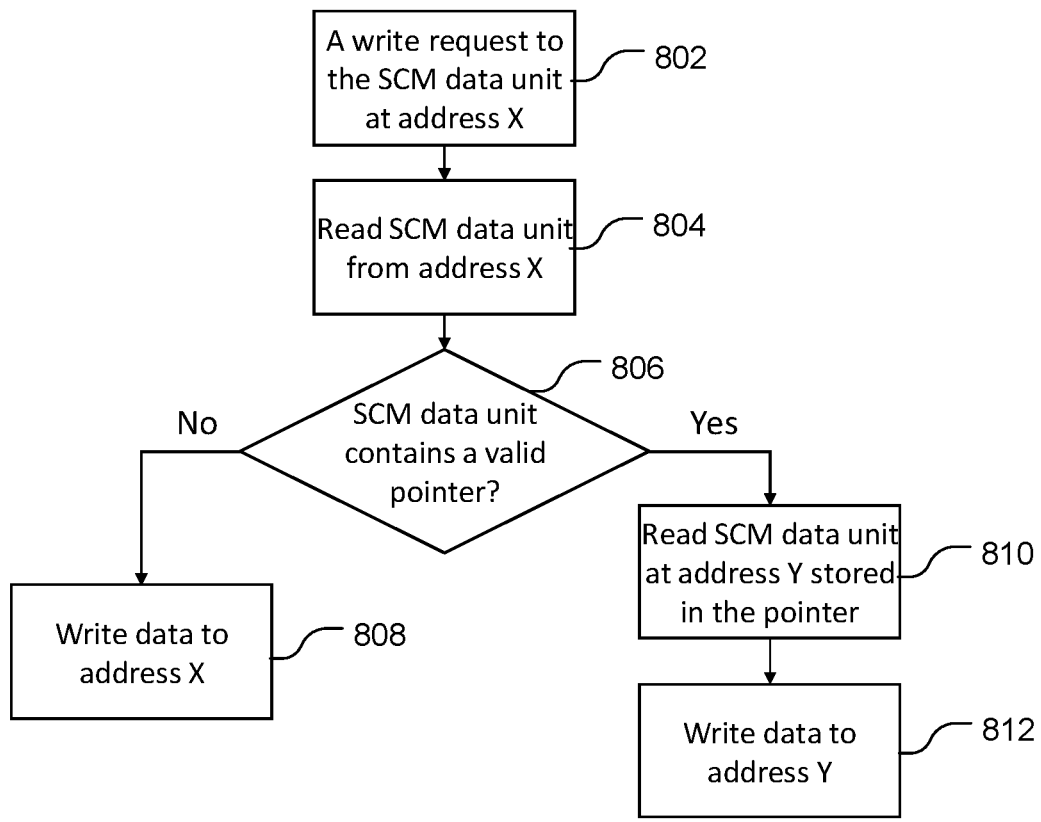
FIG. 8 illustrates the flowchart of how a write operation works according to one embodiment of the present invention.

FIG. 8 illustrates an exemplary flowchart of a write operation according to an embodiment of the present invention. If a write request is issued to the SCM data unit with address X (step 802), data is also read from one or more ECC data units in this SCM data unit (step 804). Once enough information is collected, whether the SCM data unit contains a valid pointer and whether the pointer is decodable are checked (step 806). If the SCM data unit does not contain a valid pointer (i.e., the "no" path from step 806), the new data of SCM data unit are written to the same address X (step 808). Otherwise (i.e., the "yes" path from step 806), an extra read to address Y stored in the pointer is necessary to obtain the write count for the subsequent write (step 810). The last step is to write data of SCM data unit to address Y (step 812).

Figure 9:
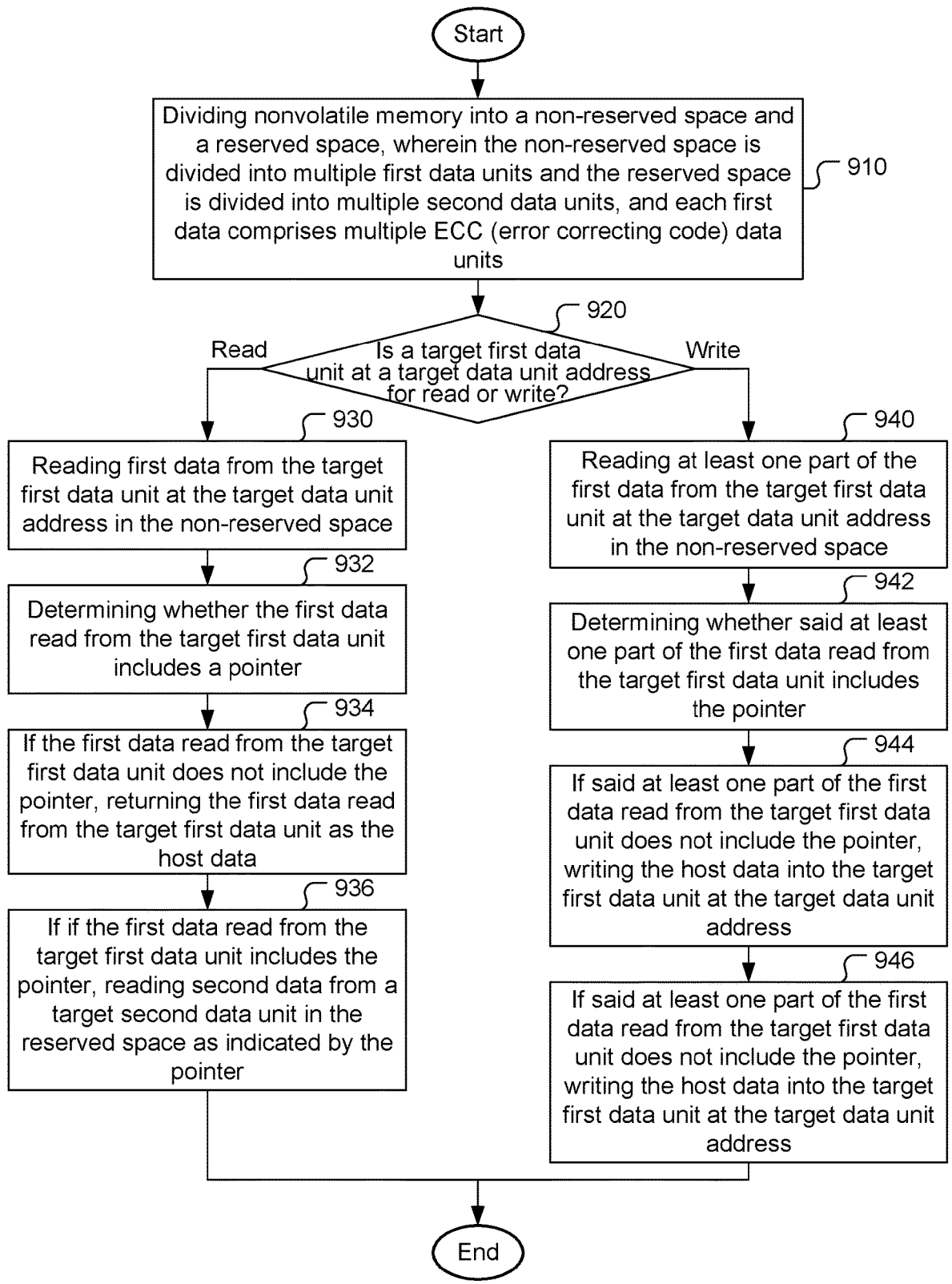
FIG. 9 illustrates an exemplary flowchart for a storage class memory system with bad location management according to an embodiment of the present invention.

FIG. 9 illustrates an exemplary flowchart for a storage class memory system with bad location management according to an embodiment of the present invention. The steps in the example may be implements using electeronic circuitry, one or more processor, programmable logics. According to this method, the nonvolatile memory is divided into a non-reserved space and a reserved space in step 910, where the non-reserved space is divided into multiple first data units and the reserved space is divided into multiple second data units, and each of the first data units and the second data units comprises multiple ECC (error correcting code) data units. In step 920, it determines whether a target first data unit at a target data unit address is for read or write. If it is data read, steps 930 to 936 are performed. If it is data write, steps 940 to 946 are performed. In step 930, first data are read from the target first data unit at the target data unit address in the non-reserved space. In step 932, whether the first data read from the target first data unit includes a pointer is determined. In step 934, if the first data read from the target first data unit does not include the pointer, the first data read from the target first data unit are returned as the host data. In step 936, if the first data read from the target first data unit includes the pointer, second data from a target second data unit in the reserved space as indicated by the pointer are read. In step 940, at least one part of the first data are read from the target first data unit at the target data unit address in the non-reserved space. In step 942, whether said at least one part of the first data read from the target first data unit includes the pointer is determined. In step 944, if said at least one part of the first data read from the target first data unit does not include the pointer, the host data are written into the target first data unit at the target data unit address. In step 946, if said at least one part of the first data read from the target first data unit includes the pointer, the host data are written into a target second data unit in the reserved space as indicated by the pointer.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of bad location management for SCM (storage class memory) based on nonvolatile memory, the method comprising:
    dividing nonvolatile memory into a non-reserved space and a reserved space, wherein the non-reserved space is divided into multiple first data units and the reserved space is divided into multiple second data units, and each of the first data units and the second data units comprises multiple ECC (error correcting code) data units;
    when host data are read from a target first data unit at a target data unit address in the non-reserved space:
        reading first data from the target first data unit at the target data unit address in the non-reserved space;
        determining whether the first data read from the target first data unit includes a pointer;
        if the first data read from the target first data unit does not include the pointer, returning the first data read from the target first data unit as the host data; and
        if the first data read from the target first data unit includes the pointer, reading second data from a target second data unit in the reserved space as indicated by the pointer; and
    when the host data are written into the target first data unit at the target data unit address in the non-reserved space:
        reading at least one part of the first data from the target first data unit at the target data unit address in the non-reserved space;
        determining whether said at least one part of the first data read from the target first data unit includes the pointer;
        if said at least one part of the first data read from the target first data unit does not include the pointer, writing the host data into the target first data unit at the target data unit address; and
        if said at least one part of the first data read from the target first data unit includes the pointer, writing the host data into a target second data unit in the reserved space as indicated by the pointer.

2. The method of claim 1 further comprising classifying the multiple first data units and the multiple second data units into multiple classes including a first class corresponding to a mostly-good data unit, wherein the mostly-good data unit comprises a number of bad ECC data units within a range.

3. The method of claim 2, wherein each of the multiple first data units comprises multiple ECC data units and said classifying the multiple first data units into the multiple classes comprises counting the number of bad ECC data units in each of the multiple first data units.

4. The method of claim 3, wherein if the number of bad ECC data units for a tested first data unit is larger than a first threshold and smaller than a second threshold, the tested first data unit is classified as the mostly-good data unit.

5. The method of claim 3, wherein if the number of bad ECC data units for a tested first data unit is smaller than a first threshold, the tested first data unit is classified as a good data unit.

6. The method of claim 3, wherein if the number of bad ECC data units for a tested first data unit is greater than a second threshold, the tested first data unit is classified as a mostly-bad data unit.

7. The method of claim 6, wherein the mostly-bad data unit is not used for data storage.

8. The method of claim 2, wherein the multiple classes further comprise a second class corresponding to good data units and a third class corresponding to mostly-bad data units.

9. The method of claim 2, wherein information associated with the multiple classes for the multiple first data units is stored in the non-volatile memory, a volatile memory, or both.

10. The method of claim 1, wherein information related to the pointer is stored in multiple ECC data units.

11. A memory system based on nonvolatile memory, the memory system comprising:
    nonvolatile memory;
    a controller coupled to the nonvolatile memory; and
    wherein the nonvolatile memory and the controller are configured to perform at least the following:
        dividing the nonvolatile memory into a non-reserved space and a reserved space, wherein the non-reserved space is divided into multiple first data units and the reserved space is divided into multiple second data units, and each of the first data units and the second data units comprises multiple ECC (error correcting code) data units;
    when host data are read from a target first data unit at a target data unit address in the non-reserved space:
        reading first data from the target first data unit at the target data unit address in the non-reserved space;
        determining whether the first data read from the target first data unit includes a pointer;
        if the first data read from the target first data unit does not include the pointer, returning the first data read from the target first data unit as the host data; and
        if the first data read from the target first data unit includes the pointer, reading second data from a target second data unit in the reserved space as indicated by the pointer; and
    when the host data are written into the target first data unit at the target data unit address in the non-reserved space:

reading at least one part of the first data from the target first data unit at the target data unit address in the non-reserved space;

determining whether said at least one part of the first data read from the target first data unit includes the pointer;

if said at least one part of the first data read from the target first data unit does not include the pointer, writing the host data into the target first data unit at the target data unit address; and if said at least one part of the first data read from the target first data unit includes the pointer, writing the host data into a target second data unit in the reserved space as indicated by the pointer.

12. The memory system of claim 11, the nonvolatile memory and the controller are configured to classify the multiple first data units and the multiple second data units into multiple classes including a first class corresponding to a mostly-good data unit, wherein the mostly-good data unit comprises a number of bad ECC data units within a range.

13. The memory system of claim 12, wherein each of the multiple first data units comprises multiple ECC data units and the multiple first data units are classified into the multiple classes comprises counting the number of bad ECC data units in each of the multiple first data units.

14. The memory system of claim 13, wherein if the number of bad ECC data units for a tested first data unit is larger than a first threshold and smaller than a second threshold, the tested first data unit is classified as the mostly-good data unit.

15. The memory system of claim 13, wherein if the number of bad ECC data units for a tested first data unit is smaller than a first threshold, the tested first data unit is classified as a good data unit.

16. The memory system of claim 13, wherein if the number of bad ECC data units for a tested first data unit is greater than a second threshold, the tested first data unit is classified as a mostly-bad data unit.

17. The memory system of claim 12, wherein the multiple classes further comprises a second class corresponding to good data units and a third class corresponds to mostly-bad data units.

* * * * *